(12) United States Patent
Shibata

(10) Patent No.: US 11,102,386 B2
(45) Date of Patent: Aug. 24, 2021

(54) IMAGING DEVICE

(71) Applicant: CANON KABUSHIKI KAISHA, Tokyo (JP)

(72) Inventor: Masayoshi Shibata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/442,116

(22) Filed: Jun. 14, 2019

(65) Prior Publication Data

US 2019/0387143 A1 Dec. 19, 2019

(30) Foreign Application Priority Data

Jun. 19, 2018 (JP) .............................. JP2018-116078

(51) Int. Cl.
*H04N 5/225* (2006.01)
*G02B 7/02* (2021.01)

(52) U.S. Cl.
CPC .............. *H04N 5/2254* (2013.01); *G02B 7/02* (2013.01); *H04N 5/2252* (2013.01)

(58) Field of Classification Search
CPC .............. H04N 5/2254; H04N 5/2252; H04N 1/00607; H04N 5/2251; H04N 5/22525; G02B 7/02; A45C 11/38; G03B 17/563
See application file for complete search history.

(56) References Cited

U.S. PATENT DOCUMENTS

| | | | |
|---|---|---|---|
| 6,561,702 B1 | 5/2003 | Yik | |
| 7,106,858 B2 * | 9/2006 | Goldberg | A45F 5/00 379/450 |
| D574,692 S * | 8/2008 | Cooper | D8/105 |
| 7,525,596 B2 * | 4/2009 | Yamaguchi | H04N 5/2252 348/375 |
| D592,530 S * | 5/2009 | Ramsey | D10/31 |
| 7,909,624 B2 * | 3/2011 | Iida | G06F 13/387 439/131 |
| 2004/0203501 A1 | 10/2004 | Johnson | |

(Continued)

FOREIGN PATENT DOCUMENTS

| | | |
|---|---|---|
| CN | 1972611 A | 5/2007 |
| CN | 101236353 A | 8/2008 |

(Continued)

OTHER PUBLICATIONS

Argus Bean 5MP 16MB, 1.5IN LCD USB Li-on, Battery Blue; https://www.amazon.com/gp/product/B0019K4UHY/%3Ftag%3Ddegeeked-20; retrieved May 24, 2019.

*Primary Examiner* — Timothy J Henn
(74) *Attorney, Agent, or Firm* — Canon U.S.A., Inc., IP Division

(57) ABSTRACT

An imaging device includes a lens, a predetermined operation member configured to receive a predetermined instruction, a frame portion configured to form an opening, at least a portion of the frame portion being an opening and closing member. In the imaging device, the predetermined operation member and the opening and closing member of the frame portion are disposed so that the predetermined operation member and the opening and closing member do not overlap each other in an operation direction of the predetermined operation member, and the frame portion forms a portion of a housing of the imaging device.

25 Claims, 7 Drawing Sheets

(56) References Cited

U.S. PATENT DOCUMENTS

| | | | |
|---|---|---|---|
| 2004/0205255 A1* | 10/2004 | Joachim | G06F 1/1626 |
| | | | 710/1 |
| 2004/0209577 A1 | 10/2004 | Park | |
| 2005/0024526 A1* | 2/2005 | Wang | H04N 5/772 |
| | | | 348/373 |
| 2005/0111308 A1* | 5/2005 | Hosey | G04B 37/148 |
| | | | 368/317 |
| 2005/0162823 A1* | 7/2005 | Hosey | G06K 19/07732 |
| | | | 361/679.4 |
| 2008/0075275 A1 | 3/2008 | Goldberg | |
| 2009/0096919 A1* | 4/2009 | Wang | G03B 17/02 |
| | | | 348/376 |
| 2009/0102414 A1* | 4/2009 | Fowler | H02J 7/35 |
| | | | 320/101 |
| 2009/0283559 A1 | 11/2009 | Foggiato | |
| 2012/0025684 A1 | 2/2012 | Trotsky | |
| 2012/0074006 A1 | 3/2012 | Monaco | |
| 2015/0097008 A1 | 4/2015 | Adeymei | |
| 2017/0307004 A1 | 10/2017 | Cardella | |
| 2019/0269231 A1* | 9/2019 | Christian | A45C 11/00 |

FOREIGN PATENT DOCUMENTS

| | | |
|---|---|---|
| CN | 101631439 A | 1/2010 |
| CN | 202270347 U | 6/2012 |
| CN | 206100281 U | 4/2017 |
| JP | 2004179850 A | 6/2004 |
| JP | 2009-147443 A | 7/2009 |
| WO | 2006/007296 A2 | 1/2006 |

* cited by examiner

… (US 11,102,386 B2)

IMAGING DEVICE

BACKGROUND OF THE INVENTION

Field of the Invention

The present invention relates to a configuration of an imaging device such as a digital camera.

Description of the Related Art

Imaging devices, such as digital cameras, exist that can be carried easily, and portability can be improved by the provision of a carabiner in the device main body. For example, Japanese Patent Laid-Open No. 2009-147443 discloses a carabiner portion that is a member different from a housing of a digital camera and that is connected to a flexible cord member that can be wound around a cord reel.

SUMMARY OF THE INVENTION

The present invention provides an imaging device including a lens, a predetermined operation member configured to receive a predetermined instruction, and a frame portion configured to form an opening, at least a portion of the frame portion being an opening and closing member. The predetermined operation member and the opening and closing member of the frame portion are disposed so that the predetermined operation member and the opening and closing member do not overlap each other in an operation direction of the predetermined operation member, and the frame portion is configured to form a portion of a housing of the imaging device.

Further features of the present invention will become apparent from the following description of exemplary embodiments with reference to the attached drawings.

DESCRIPTION OF EMBODIMENTS

Hereinafter, embodiments of the present invention will be described in detail with reference to the accompanying drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

First Exemplary Embodiment

Hereinafter, a first exemplary embodiment of the present invention will be described with reference to FIGS. 1A to 3B.

Figure 1A:
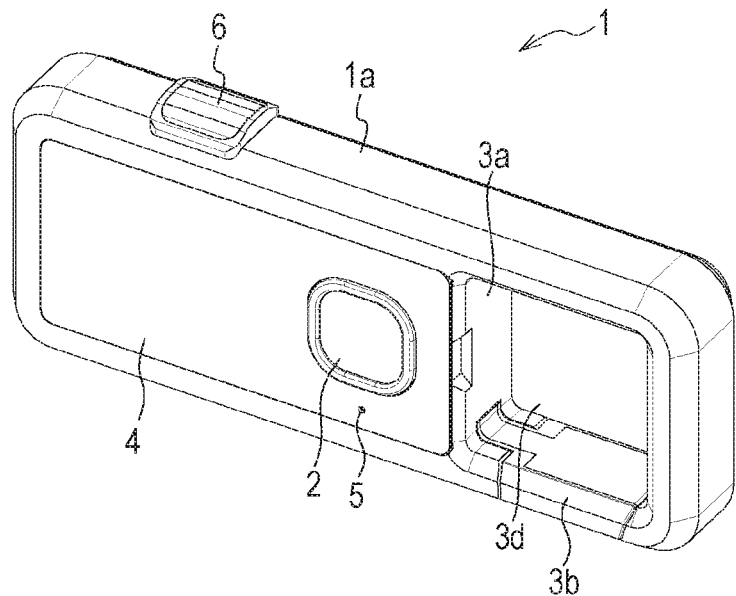
FIGS. 1A and 1B are external perspective views of a digital camera according to a first exemplary embodiment.
Figure 1B:
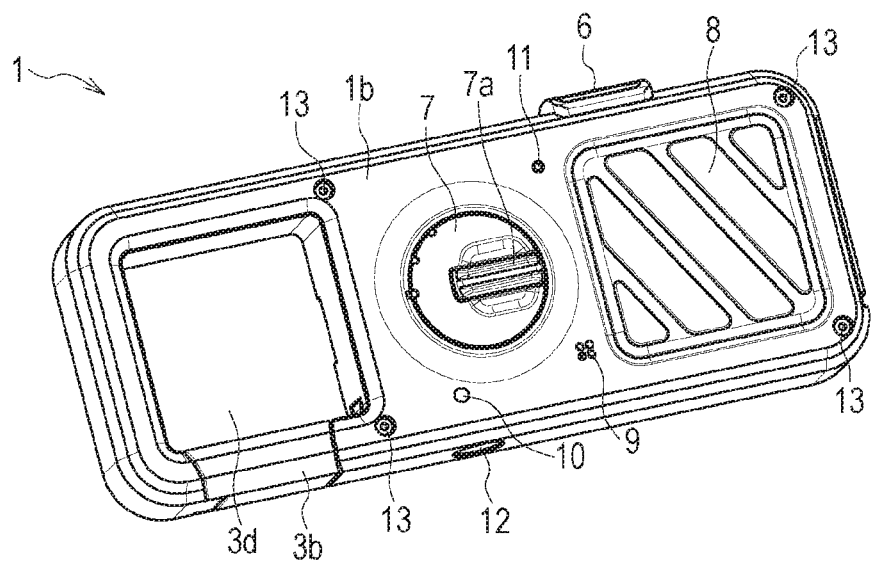

FIG. 1A is an external perspective view of a digital camera 1, which is an example of an imaging device according to a first exemplary embodiment of the present invention, viewed from the front side (the object side). FIG. 1B is an external perspective view viewed from the backside, which is opposite to the object side.

Figure 7A:
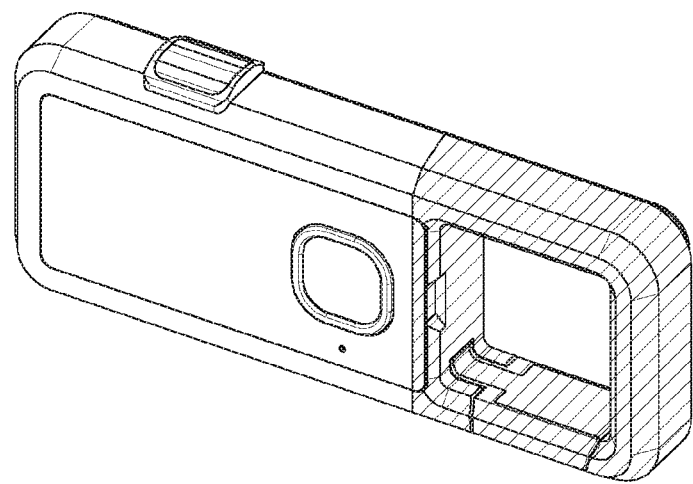
FIGS. 7A and 7B are drawings illustrating the carabiner portion of the digital camera.
Figure 7B:
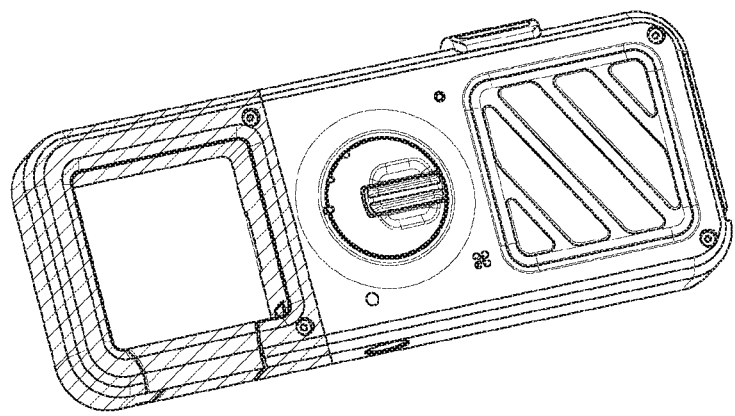

The digital camera 1 illustrated in FIGS. 1A and 1B includes a front cover 1a and a rear cover 1b serving as a body housing, and a lens portion 2. Furthermore, the digital camera 1 has a carabiner structure, and in the present exemplary embodiment, the hatched portions in FIGS. 7A and 7B are referred to as a carabiner portion 3. The carabiner portion 3 will be described in detail later. A changeable panel 4 is a panel detachable from the digital camera 1. Details thereof will be described later as well. A microphone hole 5 is a member for taking in audio from the outside and is particularly used when recording a video. A push-type release button 6 is provided on an upper surface portion, and the shooter can input a shooting instruction by performing an operation of pushing in the release button 6.

A mode switching dial 7, a back surface grip portion 8, a loudspeaker hole 9, an LED window 10, a reset button 11 are provided on the rear cover 1b side, and a tripod hole 12 is provided in a camera bottom surface portion. The mode switching dial 7 is an operation member for performing switching of the shooting mode, such as moving image mode and still image mode, and a process such as turning off the power. The back surface grip portion 8 is a member used as a finger rest on which a finger of the right hand is placed while shooting and which enhances the gripping property. The back surface grip portion 8 has an uneven surface. Screws 13 are fastening members that fix the front cover 1a and the rear cover 1b to each other. The fastened front cover 1a and the fastened rear cover 1b form an exterior of the digital camera 1 of the present exemplary embodiment.

Figure 2A:
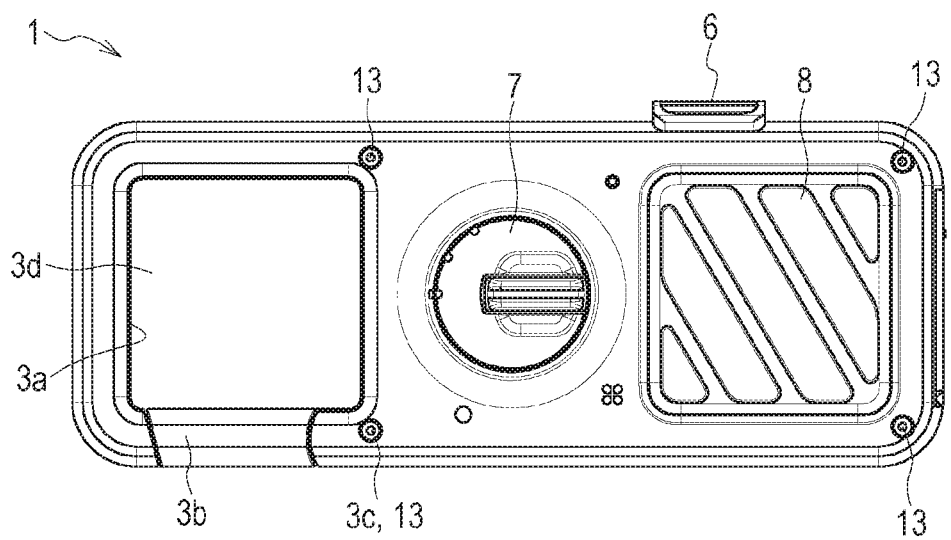
FIGS. 2A and 2B are drawings illustrating open and closed states of a carabiner portion according to the first exemplary embodiment.
Figure 2B:
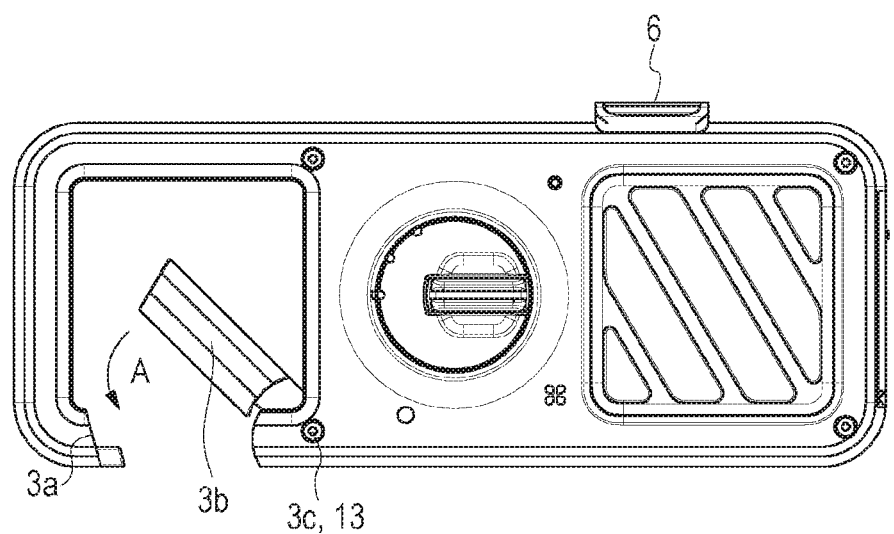

A configuration of the carabiner portion 3 will be described next. FIG. 2A is a diagram illustrating a closed state of the carabiner portion 3 and FIG. 2B is a diagram illustrating an open state of the carabiner portion 3.

In the carabiner portion 3, a frame shape is formed by a fixed member 3a and a swinging member 3b. Reference sign 3d is a cavity and forms an opening. The swinging member 3b is supported by a pivot shaft 3c and is pivotable about the pivot shaft 3c. By pivoting the swinging member 3b to a predetermined angle, an open state can be reached. Furthermore, the pivot shaft 3c also serves as the screw 13 and is also a fastening member that fixes the front cover 1a and the rear cover 1b to each other.

The swinging member 3b is an opening and closing member that opens and closes the carabiner portion 3 and receives urging force at all times in a direction of an arrow A, which is a direction in which the closed state is reached, from a spring member (not shown). A position of the swinging member 3b is restricted by being abutted against the fixed member 3a. In order to turn the swinging member 3b to the open state from the closed state, it is only necessary to push the swinging member 3b with force that is larger than the urging force exerted from the spring member.

The carabiner portion 3 of the present exemplary embodiment functions as a carabiner by having the open state and the closed state described above. Note that for convenience sake, the carabiner portion 3 is described as if the carabiner portion 3 is an independent part; however, in the present exemplary embodiment, the fixed member 3a of the carabiner portion 3 is a portion of the front cover 1a and the rear cover 1b of the digital camera 1. It can be said that the carabiner portion 3 forms a portion of the exterior of the digital camera 1. In other words, the digital camera 1 itself has a structure of a carabiner. It goes without saying that the carabiner portion 3 and the digital camera 1 do not have to be integrally formed. For example, the carabiner portion illustrated by hatching in FIGS. 7A and 7B may be prepared as a separate member, and may be configured so as to be joined to the housing of the digital camera with screws.

Figure 6A:
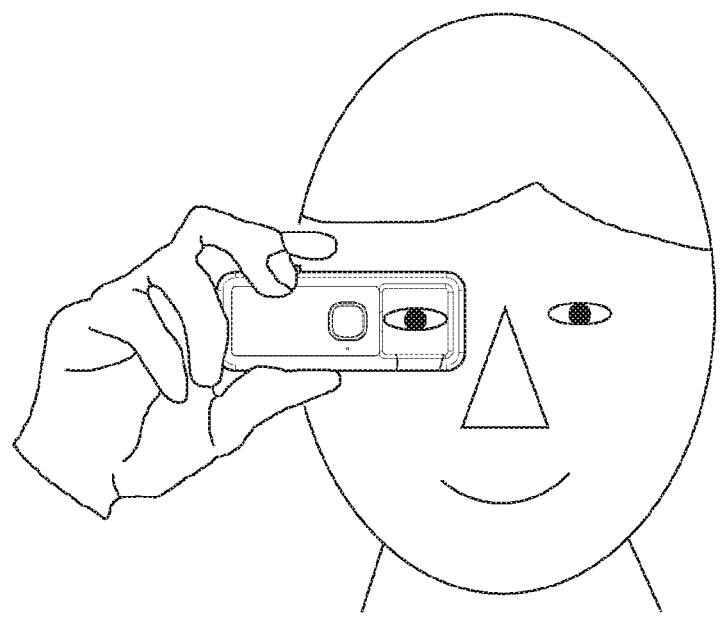
FIGS. 6A and 6B are drawings illustrating examples of use of the digital camera.

Note that in the present exemplary embodiment, the frame-shaped carabiner portion 3 also functions as a see-through finder in the shooting direction. As illustrated in FIG. 6A, when shooting with the digital camera 1, the shooter holds the digital camera 1 towards the object and confirms the shooting range by looking at the object through a finder frame, that is, the carabiner portion 3. The cavity 3d of the carabiner portion 3 has a rectangular shape (including a rectangle with rounded corners) in order to easily specify the horizontal and vertical planes of the composition when being looked through as the finder frame.

A relationship between the carabiner portion 3 and other members will be described next. The relationship between the carabiner portion 3 and the other members have a large influence on the operationality during the shooting. A specific description of the above will be given below.

As illustrated in FIG. 1A, first, a shooting lens 2 and the finder are, desirably, disposed as close as possible to each other. With such a configuration and an arrangement, a parallax between the shooting lens 2 and the finder can be reduced when shooting at a short range. Furthermore, the shooting lens 2 and the release button 6 are, desirably, disposed as far as possible from each other. With such an arrangement, when the digital camera 1 is held, the finger of the shooter can be effectively prevented from covering the shooting lens 2.

Figure 6B:
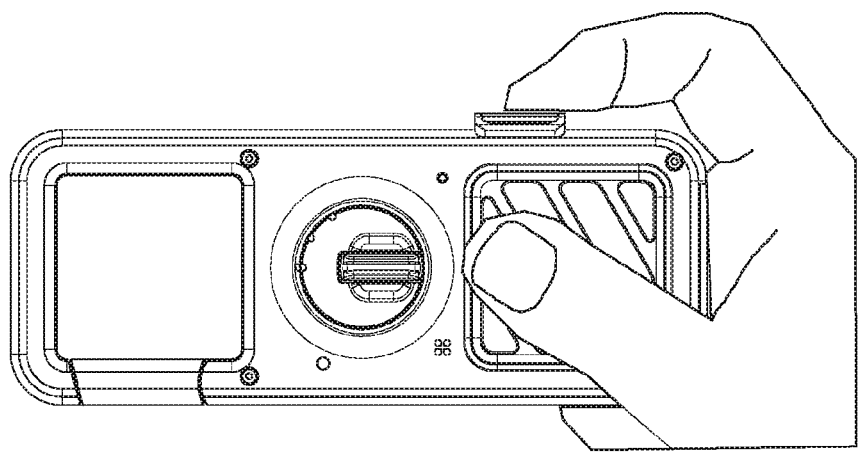

Furthermore, the carabiner portion 3 and the release button 6 are disposed so that the projections of at least a portion of the carabiner portion 3 and the release button 6 do not overlap each other in the operation direction of the release button 6, in other words, the pushing down direction of the release button 6. Referring to FIG. 6B, the configuration of the above will be described. As illustrated in FIG. 6B, in the digital camera 1 of the present exemplary embodiment, it is assumed that the shooter performs shooting using only the right hand. If the swinging member 3b of the carabiner portion 3 is at a position where the projection thereof overlaps the projection of the release button 6, when the release button 6 is pushed down, the right-hand fingers holding the camera comes into contact with the swinging member 3b and the swinging member 3b may be pivoted unintentionally. The digital camera 1 of the present exemplary embodiment is capable of reducing the occurrence of failed images, such as image blur and inclination of the composition, by disposing the carabiner portion 3 and the release button 6 so that the projections thereof do not overlap each other.

More specifically, in the digital camera 1 according to the present exemplary embodiment, as illustrated in FIGS. 1A and 1B, the carabiner portion 3, the lens portion 2, and the back surface grip portion 8 are disposed in that order from the left-hand side when viewed from the shooter side (on side opposite the object side while the shooting is performed with the digital camera in a horizontal position, the same is assumed in the description hereinafter as well), and the release button 6 is disposed above the back surface grip portion 8. With such an arrangement, the distance between the carabiner portion 3 and the release button 6 is obtained. With the above, as illustrated in FIG. 6B, when the shooting operation is performed while the digital camera 1 is held in the right hand, the right-hand finger of the shooter does not easily touch the swinging member 3b of the carabiner portion 3. Furthermore, since the back surface grip portion 8 and the release button 6 are disposed close to each other, when operating the release button 6, the digital camera 1 can be held so as to be covered by the palm; accordingly, the release button 6 can be pushed in a stable manner. Furthermore, by providing the carabiner portion 3 on the left-hand side of the shooter, when holding the digital camera 1 that is covered by the palm of the right hand, the visibility of the carabiner portion 3 serving as a finder is not impaired. From the viewpoint of operationality, desirably, the entire carabiner portion 3 is disposed so as to be contained in any of the left half region of the back surface of the digital camera 1, and the entire back surface grip portion 8 is disposed so as to be contained in any of the right half region of the back surface of the digital camera 1.

Furthermore, as illustrated in FIG. 1B, in the digital camera 1 of the present exemplary embodiment, the mode switching dial 7 is disposed between the carabiner portion 3 and the back surface grip portion 8. The mode switching dial 7 is a rotary dial, and switching of the shooting mode, such as the moving image mode or the still image mode, and a process such as turning the power off can be performed easily and swiftly by hooking the finger on a finger hooking portion 7a and performing a turning process. Since the finger hooking portion 7a is disposed closer to the back surface grip portion 8 than the carabiner portion 3, the shooter can easily hook the finger on the finger hooking portion 7a while holding the digital camera 1 with the right hand. Furthermore, since the back surface grip portion 8 and the release button 6 are disposed close to each other as well, when performing a shooting operation while holding the digital camera 1 with the right hand, the thumb can be hooked on the finger hooking portion 7a of the mode switching dial 7 while the index finger is placed on the release button 6. With the above, the shooting operation and the mode switching operation can be performed swiftly with a one hand operation.

Note that while the digital camera 1 of the present exemplary embodiment is described on the premises that the shooter performs shooting using only the right hand, it goes without saying that it may be assumed that shooting is performed with only the left hand. In such a case, the digital camera 1 may be configured so as to be inverted as a mirror image of the configuration in FIGS. 2A and 2B.

Note that the size of the carabiner portion 3 serving as the cavity 3d is desirably a size that allows a belt loop of a pair of trousers of the shooter or to a belt portion of a backpack or the like to be fixed thereto. Furthermore, if too large, the portability will be impaired; accordingly, the largest width of the see-through opening portion is approximately 30 mm in the present exemplary embodiment, and when considering the mountability and the portability, the largest width is desirably 20 mm or more and less than 50 mm.

Furthermore, the swinging member 3b of the carabiner portion 3 do not necessarily have to be disposed on the tripod hole 12 side as illustrated in FIG. 1B, and may be disposed on the upper surface portion or a lateral surface portion of the digital camera 1.

Furthermore, the body housing of the digital camera 1 of the present exemplary embodiment is covered by an elastic elastomer member such as rubber. Portions other than the lens portion 2, the changeable panel 4, the release button 6 and the mode switching dial 7 that are operation members, the reset button 11, the LED window 10 that is a window member, and the screws 13 are covered by the elastomer member. With the above, the elastomer member serving as a shock absorbing member can soften the impact on the image pickup unit and internal electronic components when dropped. Furthermore, due to the rubber elasticity and the grip performance of the elastomer member, the digital camera 1 held in one hand can be effectively prevented from being dropped due to slipping from the hand unintentionally.

Figure 3A:
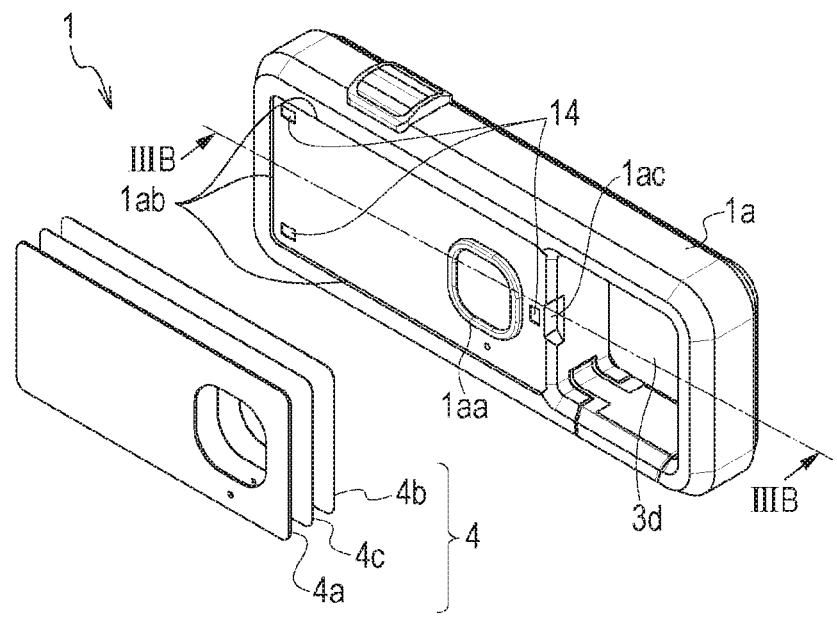
FIGS. 3A and 3B are drawings illustrating states in which the changeable panel has been attached and detached according to the first exemplary embodiment.
Figure 3B:
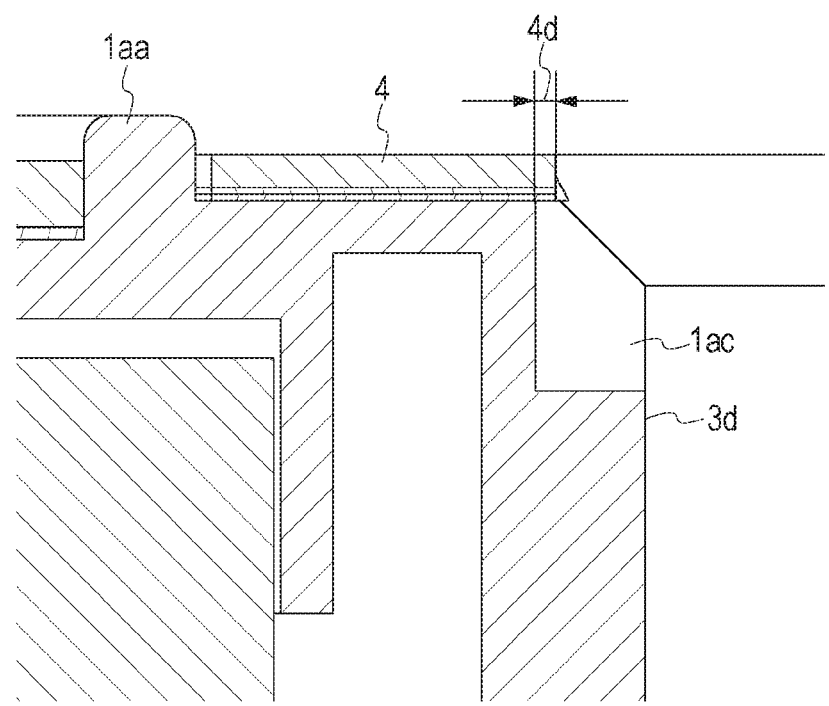

Referring hereinafter to FIGS. 3A and 3B, a description of the changeable panel 4 will be given. FIG. 3A is a perspective view illustrating a state in which the changeable panel 4 has been removed from a digital camera main body. FIG. 3B is a partial sectional view of a IIIB-IIIB portion illustrating a state in which the changeable panel has been fitted to the digital camera main body.

As illustrated in FIG. 3A, the changeable panel 4 includes an appearance portion 4a that is a thin polycarbonate sheet material on which printing has been performed or on which a designed surface shape has been given, a steel plate 4b that is attracted to magnets 14 described later, and a two-sided adhesive tape 4c that fixes the above two to each other.

It is assumed that, regarding the changeable panel 4, a plurality of types of changeable panels 4 having various appearance portions 4a will be provided by manufacturers. Accordingly, by owning a plurality of changeable panels 4 for the digital camera 1 that the user owns, the user will be able to use the digital camera 1 in a manner, such as replacing the changeable panel 4 and changing the appearance of the digital camera 1 in accordance with the situation. Accordingly, it is desirable that the changeable panel 4 is configured to be easily replaceable by the user.

In the present exemplary embodiment, in fitting the changeable panel 4, the position is determined by a protruded shape 1aa of the front cover 1a around the lens portion 2 and by an erect wall portion 1ab in which an outer shape portion of the changeable panel 4 is fitted. The changeable panel 4 is held by three magnets 14 fixed to the front cover 1a.

Note that in the exemplary embodiment described above, while the changeable panel 4 is fixed using the magnets 14, if underwater filming is not taken into consideration, a strip of two-sided adhesive tape (not shown) that has strong adhesiveness on the front cover 1a side and weak adhesiveness on the changeable panel 4 side may be used in place of the magnets 14.

Furthermore as illustrated in FIG. 3B, the changeable panel 4 is removed by the user inserting a finger in a recessed shape 1ac provided in the erect wall portion serving both as a frame of the carabiner portion 3 of the front cover 1a and as a frame of the finder. The user can easily remove the changeable panel 4 by lifting a projection 4d of the changeable panel 4 with a finger. In the present exemplary embodiment, by providing the recessed shape 1ac not on the release button 6 side but on the carabiner portion 3 side, the user can hook a tip of a finger on the recessed shape 1ac while inserting the finger into the space of the cavity 3d of the carabiner portion 3. As a result, the changeable panel 4 can be removed more easily.

According to the first exemplary embodiment, an imaging device can be provided that is capable of effectively preventing an erroneous operation from being performed during shooting with the imaging device including the carabiner portion. Furthermore, the first exemplary embodiment also enables the user to easily replace the changeable panel.

Second Exemplary Embodiment

Figure 4A:
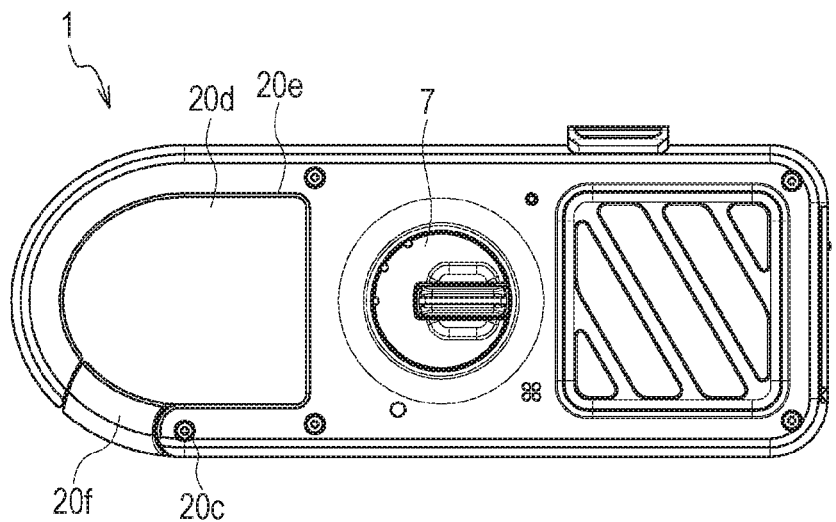
FIGS. 4A and 4B are drawings illustrating the open and closed states of a carabiner portion according to a second exemplary embodiment.
Figure 4B:
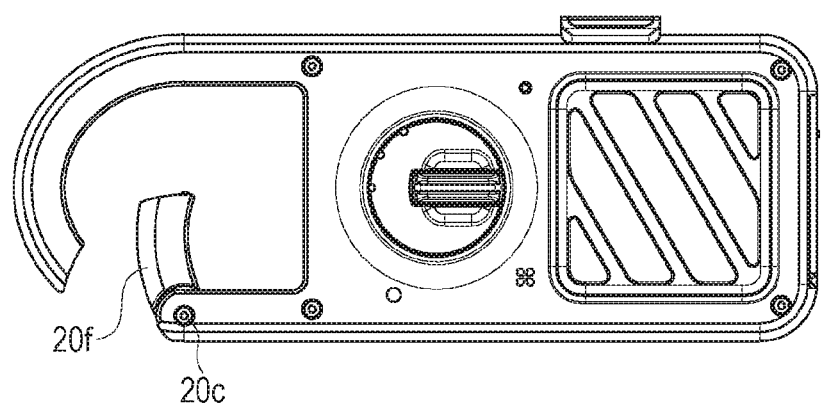

Referring hereinafter to FIGS. 4A and 4B, a description of a second exemplary embodiment will be described. Other than the details described below, the configuration is similar to that of the first exemplary embodiment; accordingly, description thereof will be omitted.

As illustrated in FIGS. 4A and 4B, the digital camera 1 of the present exemplary embodiment includes a carabiner portion 20 in which a portion of the shape of the carabiner portion 3 according to the first exemplary embodiment has an elliptical shape. FIG. 4A is a diagram illustrating a closed state of the carabiner portion 20 and FIG. 4B is a diagram illustrating an open state of the carabiner portion 20.

As illustrated in FIG. 4A, in the carabiner portion 20 of the second exemplary embodiment, the mode switching dial 7 side has a halved rectangular shape in which, same as the first exemplary embodiment, straight lines orthogonally intersect each other, and the lateral surface side of the digital camera 1 on the opposite side has an elliptical shape.

In FIG. 4B, a swinging member 20f of the carabiner portion 20 reaches, same as the first exemplary embodiment, an open state when pivoted about a pivot shaft 20c to a predetermined angle. Reference sign 20d is a cavity and forms an opening.

Figure 5A:
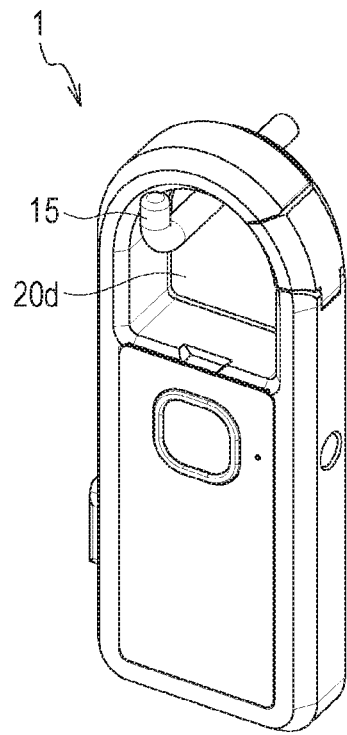
FIGS. 5A and 5B are drawings illustrating a state in which the carabiner portion is engaged with a mounting hook with the digital camera in a vertical state.
Figure 5B:
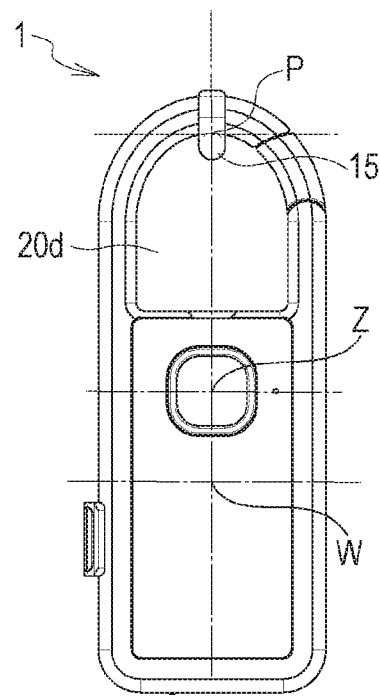

FIG. 5A is a perspective view illustrating a state in which the carabiner portion 20 is engaged with a mounting hook 15 with the digital camera in a vertical state. FIG. 5B is a front view of FIG. 5A.

A position where the mounting hook 15 and a fixing portion 20e of the carabiner portion 20 are engaged with each other while the carabiner portion 20 of the digital camera 1 is engaged with the mounting hook 15 fixed to the wall is, as illustrated in FIG. 5B, an apex P of the elliptical shape. In the above state, when a center of gravity W of the digital camera 1 is on an extended line of a straight line connecting the apex P of the elliptical shape and an imaging optical axis Z of the lens portion 2, the digital camera 1 can be positioned without any inclination and rotation as illustrated in FIG. 5B. With the above, an image close to horizontal can be easily taken without any special positioning, just by engaging the digital camera 1 with the mounting hook 15.

Furthermore, the mode switching dial 7 side has a rectangular shape because the rectangular shape serves as a guide to set the horizontal plane and the vertical plane when handheld photography is performed.

When the elliptical shape of the exemplary embodiment described above is a shape in which the apex P is located at a single portion, such as a semicircular shape, a portion of an arc shape, or a corner of a rectangle, a similar effect can be obtained.

Other Exemplary Embodiments

The exemplary embodiments described above have been described with a so-called carabiner; however, various configurations having a frame structure in which at least one end can be opened and closed can be adopted.

Furthermore, while the exemplary embodiments described above have been described with a digital camera as an example, the present invention can be used in an electronic device such as a video camera or a smartphone provided with an image pickup element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-116078 filed Jun. 19, 2018, which is hereby incorporated by reference herein in its entirety.

What is claimed is:

1. An imaging device comprising:
a lens;
a release operation member configured to receive a shooting instruction; and
a housing having a frame portion configured to form an opening, at least a portion of the frame portion being an opening and closing member,
wherein the release operation member and the opening and closing member of the frame portion are disposed so that the release operation member and the opening and closing member do not overlap each other in an operation direction of the release operation member, and
wherein the release operation member and the lens are disposed so that the release operation member and the lens do not overlap each other in an operation direction of the release operation member, and
wherein in a longitudinal direction of the housing of the imaging device, the lens is disposed between the frame portion and the release operation member, and
wherein in the longitudinal direction of the housing of the imaging device, a distance between the opening and the lens is less than a distance between the lens and the release operation member.

2. The imaging device according to claim 1,
wherein the opening and closing member of the frame portion is configured so as to be pivotable around a shaft.

3. The imaging device according to claim 1,
wherein the frame portion constitutes a carabiner.

4. The imaging device according to claim 1, further comprising:
a front surface on the object side of the device and a back surface on a side of the device parallel with and opposite to the object side of the device, and
a finger rest portion useable to hold the imaging device,
wherein the finger rest portion is disposed on the back surface of the device.

5. The imaging device according to claim 4,
wherein in the longitudinal direction of the housing of the imaging device, the lens is disposed between the frame portion and the finger rest portion.

6. The imaging device according to claim 5,
wherein the release operation member and the finger rest portion are disposed on different surfaces of the device.

7. The imaging device according to claim 4,
wherein the release operation member is disposed on an upper surface of the device, which is disposed between, and oriented orthogonally to, the front and back surfaces of the device.

8. The imaging device according to claim 4, further comprising:
a second operation member different from the release operation member, the second operation member being disposed on the same surface of the device as the finger rest portion
and being disposed between the frame portion and the finger rest portion in the longitudinal direction of the housing of the imaging device.

9. The imaging device according to claim 1,
wherein the release operation member is a push button.

10. The imaging device according to claim 1,
wherein the opening of the frame portion is formed at least by a first straight line and a second straight line, and the second straight line is orthogonal to a straight line that is parallel with the first straight line.

11. The imaging device according to claim 1,
wherein the opening of the frame portion is formed at least by two straight lines that are parallel with each other and by another one straight line.

12. The imaging device according to claim 1,
wherein the opening of the frame portion is formed at least by a pair of first straight lines that are parallel with each other and by a pair of second straight lines that are parallel with each other.

13. The imaging device according to claim 12,
wherein the pair of second straight lines is orthogonal to a straight line that is parallel with the pair of first straight lines.

14. An imaging device comprising:
a lens;
a release operation member configured to receive a shooting instruction; and
a housing having a frame portion configured to form an opening, at least a portion of the frame portion being an opening and closing member,
wherein in a longitudinal direction of the housing of the imaging device, the lens is disposed between the frame portion and the release operation member,
wherein in the longitudinal direction of the housing of the imaging device, a distance between the opening and the lens is less than a distance between the lens and the release operation member, and
wherein the release operation member and the lens are disposed so that the release operation member and the lens do not overlap each other in an operation direction of the release operation member.

15. The imaging device according to claim 14,
wherein the opening and closing member of the frame portion is configured so as to be pivotable around a shaft.

16. The imaging device according to claim 14,
wherein the frame portion constitutes a carabiner.

17. The imaging device according to claim 14, further comprising:
a front surface on the object side of the device and a back surface on a side of the device parallel with and opposite to the object side of the device, and
a finger rest portion useable to hold the imaging device,
wherein the finger rest portion is disposed on the back surface of the device.

18. The imaging device according to claim 17,
wherein in the longitudinal direction of the housing of the imaging device, the lens is disposed between the frame portion and the finger rest portion.

19. The imaging device according to claim 18, wherein the release operation member and the finger rest portion are disposed on different surfaces of the device.

20. The imaging device according to claim 14, wherein the release operation member and the opening and closing member of the frame portion are disposed so that the release operation member and the opening and closing member do not overlap each other in an operation direction of the release operation member.

21. The imaging device according to claim 14, wherein the release operation member is a push button.

22. The imaging device according to claim 14, wherein the opening of the frame portion is formed at least by a first straight line and a second straight line, and the second straight line is orthogonal to a straight line that is parallel with the first straight line.

23. The imaging device according to claim 14, wherein the opening of the frame portion is formed at least by two straight lines that are parallel with each other and by another one straight line.

24. The imaging device according to claim 14, wherein the opening of the frame portion is formed at least by a pair of first straight lines that are parallel with each other and by a pair of second straight lines that are parallel with each other.

25. The imaging device according to claim 24, wherein the pair of second straight lines is orthogonal to a straight line that is parallel with the pair of first straight lines.

* * * * *